US006862864B2

(12) United States Patent
O'Banion et al.

(10) Patent No.: US 6,862,864 B2
(45) Date of Patent: Mar. 8, 2005

(54) METHOD AND APPARATUS FOR FASTENING STEEL FRAMING MEMBERS

(75) Inventors: Michael L. O'Banion, Westminster, MD (US); Robert Gehret, Hampstead, MD (US); Robert Alan Berry, Mt. Airy, MD (US); Thomas Wheeler, Pamona, CA (US); Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 20 days.

(21) Appl. No.: 10/176,838

(22) Filed: Jun. 21, 2002

(65) Prior Publication Data

US 2003/0009958 A1 Jan. 16, 2003

Related U.S. Application Data

(60) Provisional application No. 60/299,994, filed on Jun. 21, 2001, provisional application No. 60/299,929, filed on Jun. 21, 2001, and provisional application No. 60/299,951, filed on Jun. 21, 2001.

(51) Int. Cl.[7] .............................................. E04C 2/38
(52) U.S. Cl. ..................... 52/800.16; 52/653.1; 411/45; 411/41; 403/229; 403/387; 29/525.03
(58) Field of Search ........................... 52/800.16, 653.1; 411/45, 41, 46, 48, 60.1; 403/229, 387, 388; 29/525.03, 525.05, 525.06

(56) References Cited

U.S. PATENT DOCUMENTS

| 1,444,618 A | 2/1923 | Levingston |
| 1,912,222 A | 5/1933 | Heyman |
| 2,006,813 A | 7/1935 | Norwood |
| 2,178,187 A | 10/1939 | Sake |
| 2,410,047 A | 10/1946 | Burrows et al. |
| 2,429,239 A | 10/1947 | Rogers |
| 2,944,262 A | 7/1960 | Richman et al. |
| 2,994,243 A | 8/1961 | Langstroth |
| 3,322,017 A | 5/1967 | Dufficy |
| 3,332,311 A | 7/1967 | Schultz |

(List continued on next page.)

FOREIGN PATENT DOCUMENTS

| DE | 155 135 C | 10/1904 |
| DE | 308 681 C | 10/1918 |
| DE | 369 395 C | 2/1923 |
| DE | 2557845 A1 | 6/1977 |
| DE | 31 47 430 A | 6/1983 |

(List continued on next page.)

OTHER PUBLICATIONS

International Search Report for PCT/US02/19727 mailed Sep. 16, 2002.

*Primary Examiner*—Carl D. Friedman
*Assistant Examiner*—Chi Q Nguyen
(74) *Attorney, Agent, or Firm*—Harness, Dickey & Pierce, P.L.C.

(57) ABSTRACT

Various improved methods are provided for fastening two of more steel framing members together with a fastener. In one aspect, the fastening technique employs a fastener having a tip section such that a portion of the tip section extending beyond the underside of the framing members may be outwardly flared, thereby inhibiting removal of the fastener from the framing members In another aspect, the fastening technique employs a fastener having a steel tip nose for piercing the framing members and a plastic stem section, such that a portion of the stem section extending beyond the underside of the framing members expands, thereby inhibiting removal of the fastener from the framing members. In yet another aspect, the fastening technique employs a fastener having a coil section with an elastic characteristic.

8 Claims, 13 Drawing Sheets

U.S. PATENT DOCUMENTS

| | | | |
|---|---|---|---|
| 3,722,280 A | | 3/1973 | Van Greuingen |
| 3,882,755 A | | 5/1975 | Enstrom |
| 3,925,875 A | | 12/1975 | Doke |
| 4,025,029 A | | 5/1977 | Kotas et al. |
| 4,094,054 A | * | 6/1978 | Fischer .................. 29/460 |
| 4,183,239 A | | 1/1980 | Stubbings |
| 4,218,953 A | | 8/1980 | Haytayan |
| 4,402,641 A | | 9/1983 | Arff |
| 4,511,296 A | | 4/1985 | Stol |
| 4,601,625 A | * | 7/1986 | Ernst et al. ............ 411/387.4 |
| 4,708,552 A | | 11/1987 | Bustos et al. |
| 4,787,795 A | | 11/1988 | Kraus |
| 4,810,150 A | | 3/1989 | Matsukane et al. |
| 4,840,523 A | * | 6/1989 | Oshida .................. 411/48 |
| 4,902,182 A | | 2/1990 | Lewis |
| 5,030,051 A | * | 7/1991 | Kaneko et al. ............ 411/55 |
| 5,207,750 A | * | 5/1993 | Rapata .................. 411/38 |
| 5,240,361 A | * | 8/1993 | Armstrong et al. ........ 269/48.2 |
| 5,253,965 A | | 10/1993 | Angel |
| 5,259,689 A | * | 11/1993 | Arand et al. ............. 403/337 |
| 5,286,151 A | * | 2/1994 | Eshraghi .................. 411/43 |
| 5,323,632 A | | 6/1994 | Shirasaka et al. |
| 5,333,483 A | | 8/1994 | Smith |
| 5,375,957 A | | 12/1994 | Golledge |
| 5,376,097 A | | 12/1994 | Phillips |
| 5,567,101 A | | 10/1996 | Martin |
| 5,658,110 A | | 8/1997 | Kraus |
| 5,718,142 A | | 2/1998 | Ferraro |
| 5,741,099 A | * | 4/1998 | Aasgaard .................. 411/29 |
| 5,775,860 A | * | 7/1998 | Meyer .................. 411/46 |
| 5,829,817 A | * | 11/1998 | Ge .................. 296/97.9 |
| 5,855,099 A | * | 1/1999 | Hoffman .................. 52/202 |
| 5,987,718 A | * | 11/1999 | Kelly .................. 24/705 |
| 6,023,898 A | * | 2/2000 | Josey .................. 52/309.5 |
| 6,273,656 B1 | * | 8/2001 | Cleland et al. ............. 411/45 |
| 6,276,644 B1 | | 8/2001 | Jennings et al. |
| 6,354,683 B1 | | 3/2002 | Benbow |
| 2002/0071741 A1 | | 6/2002 | Oswald |

FOREIGN PATENT DOCUMENTS

| | | |
|---|---|---|
| DE | 199 34 998 A | 2/2001 |
| FR | 2 595 609 | 9/1987 |
| FR | 2651283 | 8/1989 |
| FR | 2745863 | 3/1996 |
| GB | 608 373 A | 9/1948 |
| JP | 59 185529 A | 10/1984 |
| WO | WO 92 03664 A | 3/1992 |
| WO | WO 01 38746 A | 5/2001 |
| WO | WO 01 65125 A | 9/2001 |
| WO | WO 03/001075 | 1/2003 |

* cited by examiner

12 # METHOD AND APPARATUS FOR FASTENING STEEL FRAMING MEMBERS

CROSS-REFERENCE TO RELATED APPLICATIONS

This application claims the benefit of U.S. Provisional Application Nos. 60/299,994, 60/299,929, and 60/299,951 each of which were filed on Jun. 21, 2001.

BACKGROUND OF THE INVENTION

The present invention relates generally to steel framing and, more particularly, to an improved cost-effective method for fastening steel framing.

Steel framing is revolutionizing the construction industry. Steel is a high quality framing material that will not shrink, warp, or attract termites and other wood boring insects. In recent years, the price of steel has become more competitive with wood and other construction materials. However, despite its advantages, steel framing has not become prevalent in the residential construction industry. The lack of a quick and cost effective technique for fastening steel members has prevented steel framing from emerging as the predominant building material in residential construction.

Therefore, it is desirable to provide a quick and cost-effective technique for fastening steel members. It is envisioned that the steel fastening technique will be comparable in speed to an air nailer used to fasten wood materials. It is further envisioned that the steel fastening technique will provide a minimal gap between steel members, a pullout force of at least 216 lb., a shear force of at least 164 lb., as well as cause minimal destruction of any galvanize coating on the steel members.

SUMMARY OF THE INVENTION

In accordance with the present invention, various improved methods are provided for fastening two of more steel framing members together with a fastener. In one aspect of the invention, the fastening technique employs a fastener having a tip section such that a portion of the tip section extending beyond the underside of the framing members may be outwardly flared, thereby inhibiting removal of the fastener from the framing members In another aspect of the present invention, the fastening technique employs a fastener having a steel tip nose for piercing the framing members and a plastic stem section, such that a portion of the stem section extending beyond the underside of the framing members expands, thereby inhibiting removal of the fastener from the framing members. In yet another aspect of the present invention, the fastening technique employs a fastener having a coil section with an elastic characteristic.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
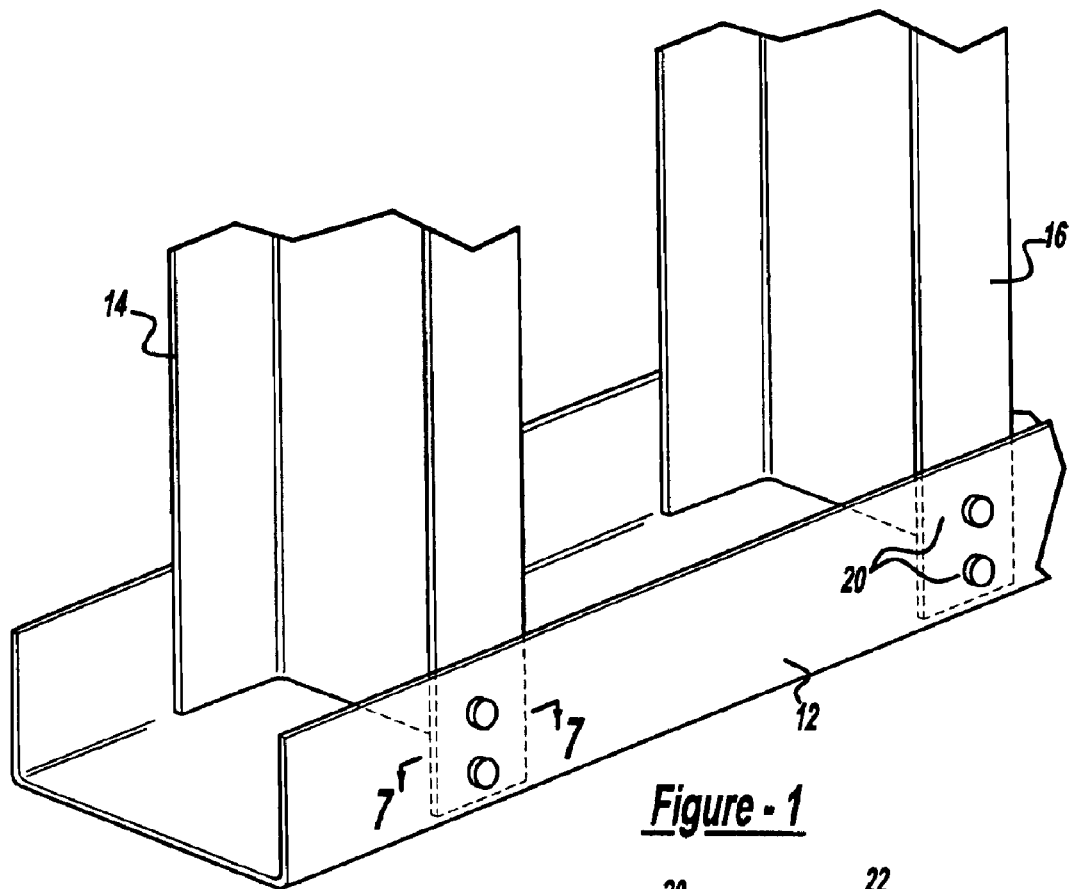
FIG. 1 is a fragmentary prospective view of a steel framing member having two additional steel framing members fastened thereto in accordance with the present invention.

Referring to FIG. 1, a fragmentary prospective view of a longitudinal steel framing member 12 having two upright steel framing members 14 and 16 fastened thereto. Each c-shaped framing member includes a bottom wall and two side walls having a thickness in the range from 0.018" to 0.071". Additionally, each steel member may range from 33 ksi to 80 ksi as is well known in the art. As will be more fully described below, one or more fasteners 20 may be used to join the upright steel framing members 14 and 16 to the longitudinal steel framing member 12. While the following description is provided with reference to this particular configuration, it is readily understood that the fastening technique of the present invention is applicable to any two or more adjacent members made of steel (e.g., carbon steel, hardened steel, stainless steel, tool steel, etc.) or other material having similar attributes to those of steel (e.g., nonferrous metals, including nickel, alloys, titanium, copper and aluminum).

Figure 2:
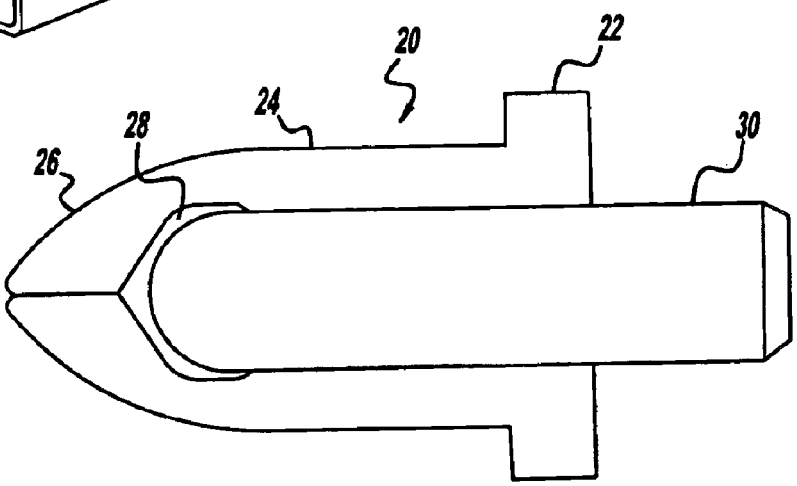
FIG. 2 is a side view of a first preferred embodiment of an outwardly expanding fastener in accordance with the present invention.

In accordance with one aspect of the present invention, one or more outwardly expanding fasteners 20 may be used to join the steel members. A first exemplary embodiment of an outwardly expanding fastener 20 is depicted in FIG. 2. The fastener 20 is comprised of an integrally formed member having a head section 22, a stem section 24 and a tip section 26. The fastener 20 further includes a bore 28 which is formed into the head section 22 of the fastener. The bore 28 extends downwardly through the stem section 24 and into the tip section 26 of the fastener. As further described below, the bore 28 is adapted to receive a pin 30 therein. The fastener 20 is preferably comprised of a harden steel material or, alternatively, a softer steel material having a tip section formed of a hardened material such as carbide, ceramic, or a harden steel.

Figure 4:
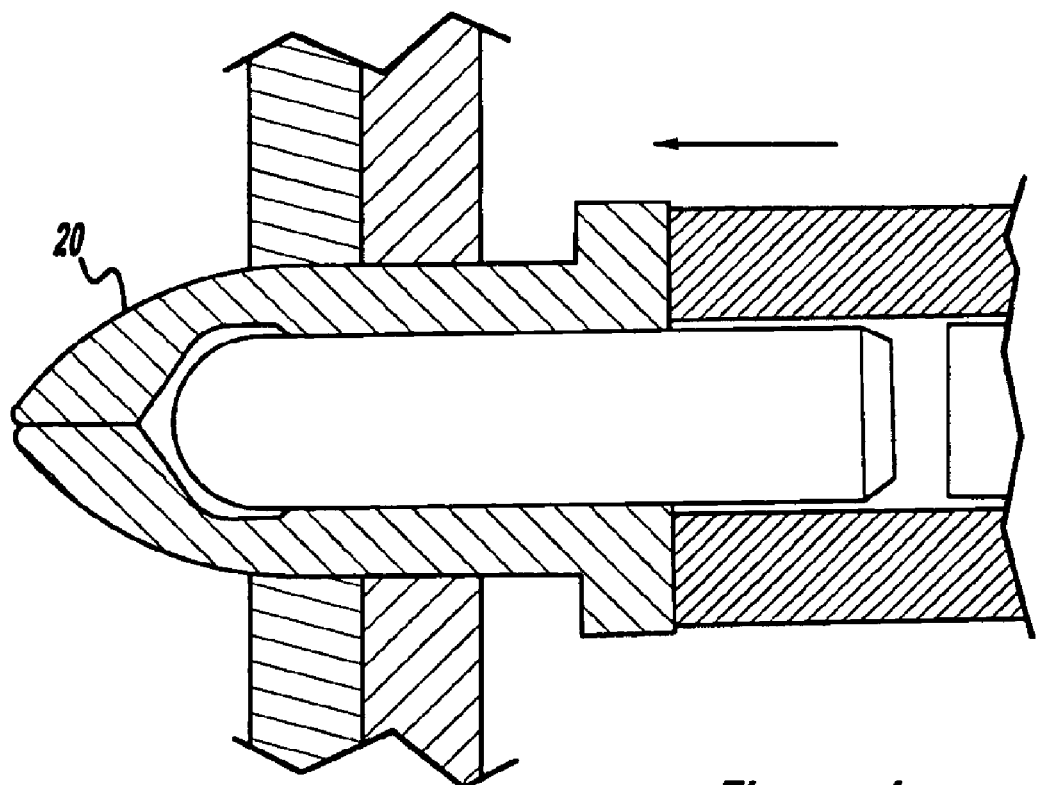
FIG. 4 is a cross-sectional view, taken along line 5—5 of FIG. 1, illustrating the first preferred embodiment of an outwardly expanding fastener penetrating partially through the steel members in accordance with the present invention.
Figure 5:
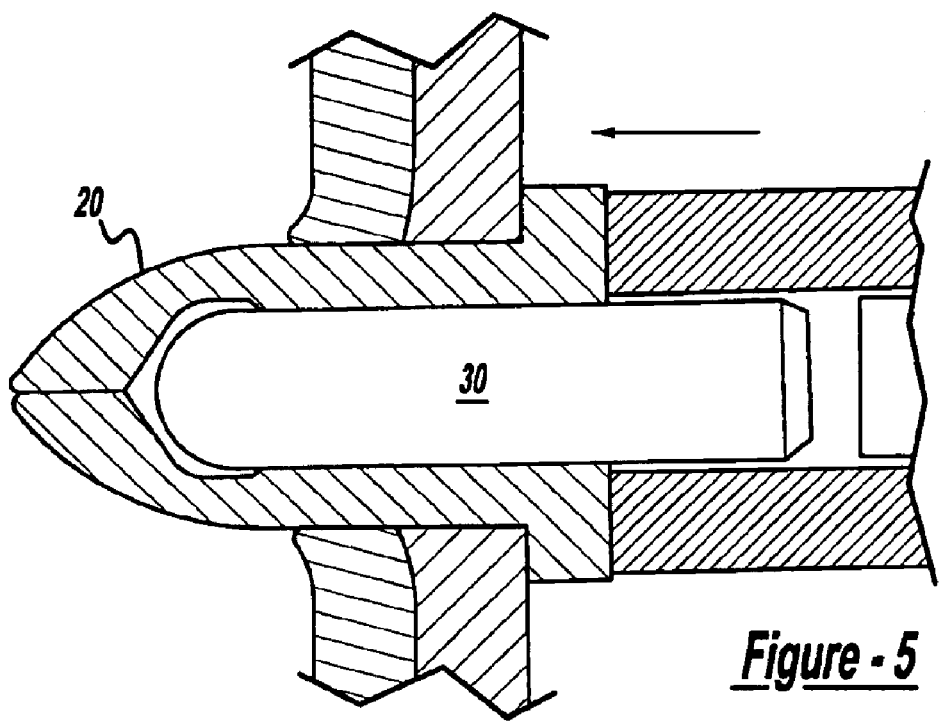
FIG. 5 is a cross-sectional view, taken along line 5—5 of FIG. 1, illustrating the outwardly expanding fastener being driven against the outer surface of the steel members in accordance with the present invention.

In operation, a two-step process is used to set the fastener 20 into the framing members. First, the expanding fastener 20 is driven into the steel members until the head of the fastener seats against the outer surface of the steel members as shown in FIGS. 4 and 5. It is readily understood that the driving device is configured to engage the head section 22 of the fastener and may provide a backplate to prevent unwanted deformation of the steel at the point at which the fastener pierces the steel members. In one embodiment, the driving device drives the fasteners at relatively high speeds (e.g., greater than 50 feet per second). In an alternative embodiment, the driving device may drive the fastener at lower speeds, but apply a relatively high force. One skilled in the art will readily recognize that an air nailer or other known driving devices may be configured to drive the fasteners 20 of the present invention into the steel members.

Figure 3:
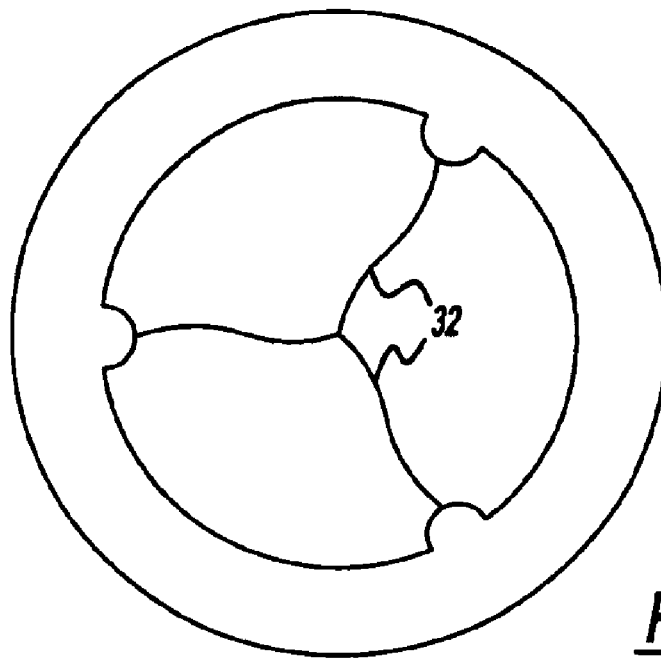
FIG. 3 is a bottom view of the outwardly expanding fastener illustrating fracture lines in accordance with the present invention.
Figure 6:
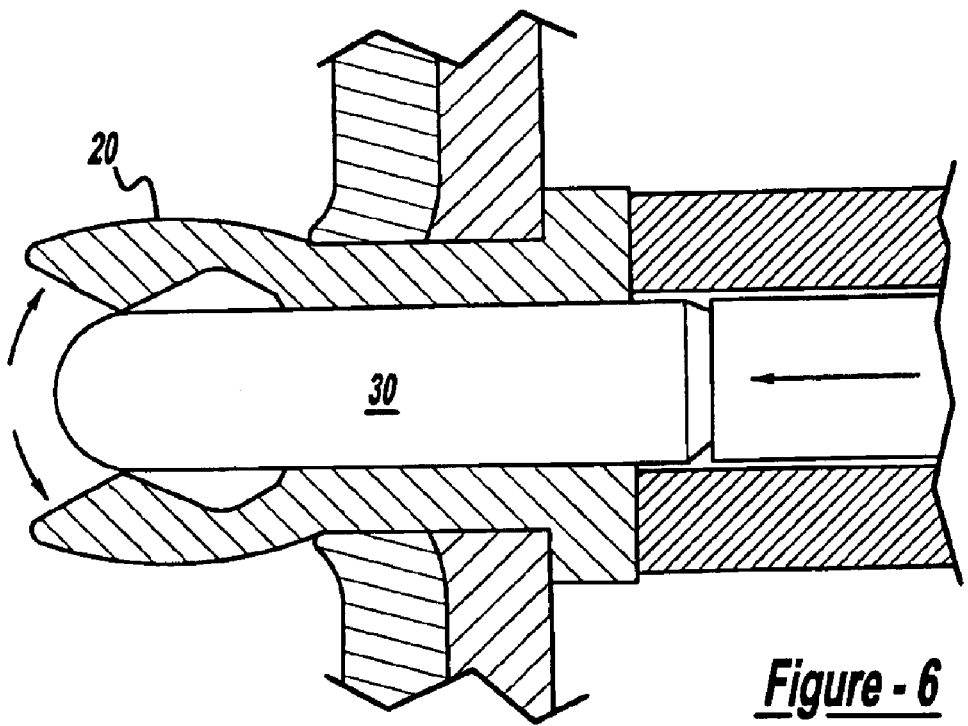
FIG. 6 is a cross-sectional view, taken along line 5—5 of FIG. 1, illustrating a pin being driven into a bottom portion of the outwardly expanding fastener in accordance with the present invention.
Figure 7:
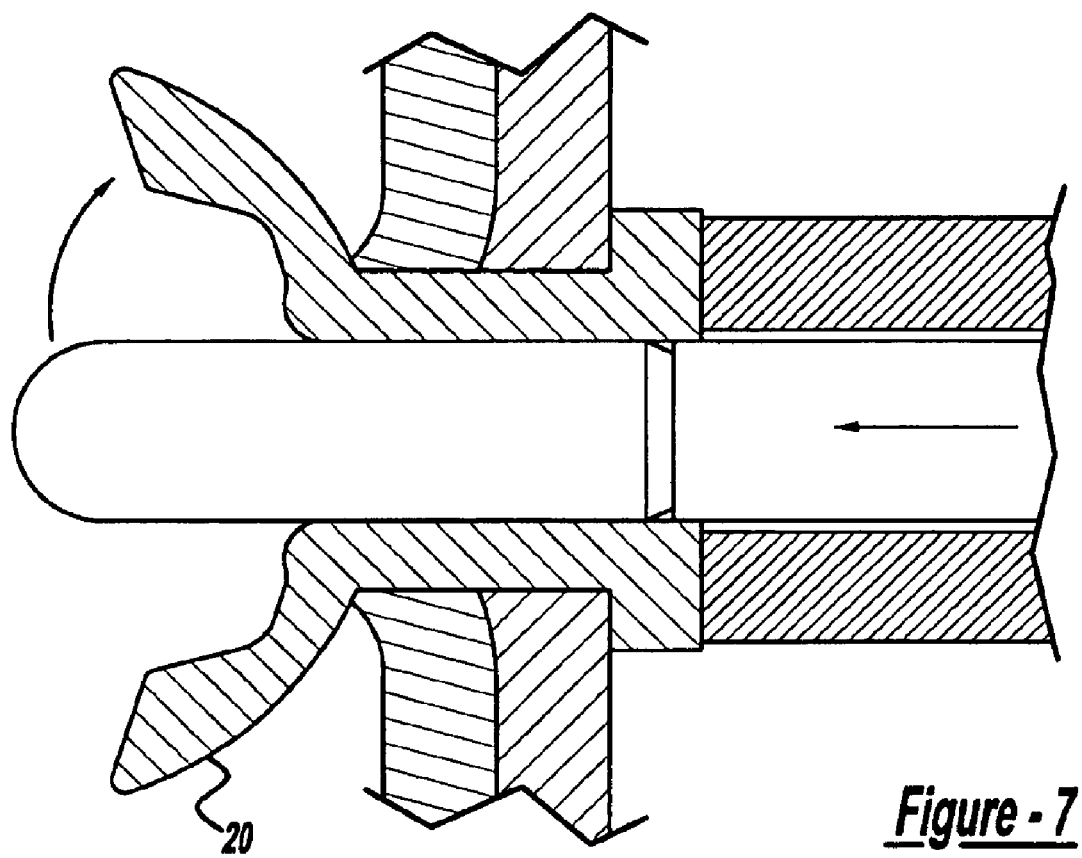
FIG. 7 is a cross-sectional view, taken along line 5—5 of FIG. 1, illustrating the radially outwardly flaring of the tip section of the fastener in accordance with the present invention.

Once the fastener 20 has been driven into place, a pin 30 is then driven through the bore 28 and into contact with the inner surface of the tip section 26 of the fastener. Upon impact, the pin 30 forces a portion of the fastener extending beyond the underside of the steel members to project radially outward as shown in FIGS. 6 and 7. The radially flared portions of the tip section 26 prevents removal of the fastener from the steel members. To facilitate the separation of the tip section 26, it is envisioned that one or more fracture lines 32 may be formed in the tip section 26 of the fastener 20 as depicted in FIG. 3. It is further envisioned that the fracture lines may not extend to the distal end of the tip section 26, thereby maintaining the structural integrity of the tip section 26 as it is driven into the framing members. Alternatively, separation of tip section 26 can be facilitated by forming the tip section 26 from two or more segmented members. The segmented members are not connected to one another at tip section 26 and, therefore, do not require fracture lines 32 to facilitate the separation of tip section 26.

In one embodiment, the pin 30 resides in the bore 28 of the fastener as shown in FIG. 2. In this case, the driving device may be configured to provide a two-step actuation mechanism: a first step for driving the fastener into the steel members, and a second step for driving the pin 30 into the bore of the fastener. In an alternative embodiment, it is envisioned that the pin 30 may be integrated into the driving device that drives the fastener 20 into the steel members.

Figure 8:
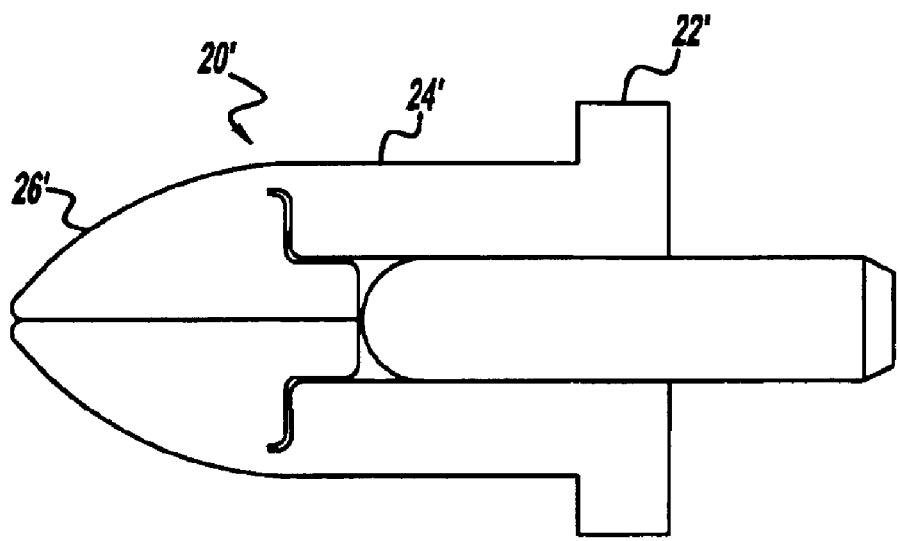
FIG. 8 is a side view of a second preferred embodiment of an outwardly expanding fastener in accordance with the present invention.
Figure 9:
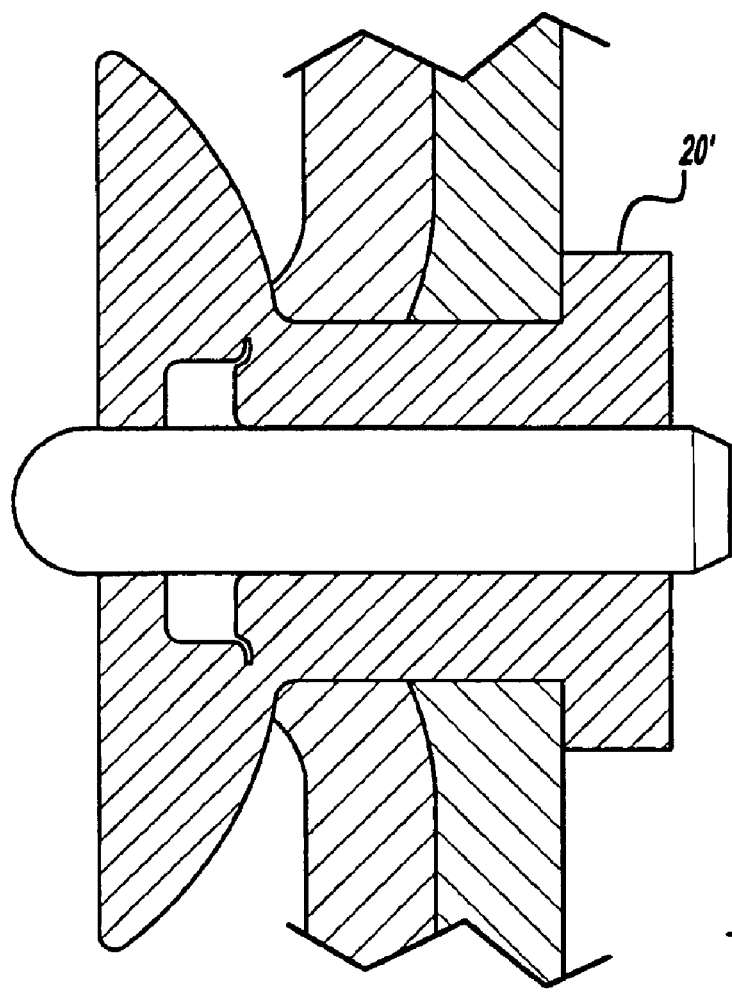
FIG. 9 is a cross-sectional view, taken along line 5—5 of FIG. 1, illustrating the radially outwardly flaring of the tip section of the second preferred embodiment of an outwardly expanding fastener in accordance with the present invention.

A second exemplary embodiment of the expanding fastener 20' is depicted in FIG. 8. As described above, the expanding fastener 20 is comprised of an integrally formed member having a head section 22', a stem section 24', and a tip section 26'. However, in this embodiment, the tip section 26' of the fastener 20' is designed to project radially outward into a butterfly position as shown in FIG. 9; otherwise the expanding fastener 20' is set using the two step process described above.

Figure 10:
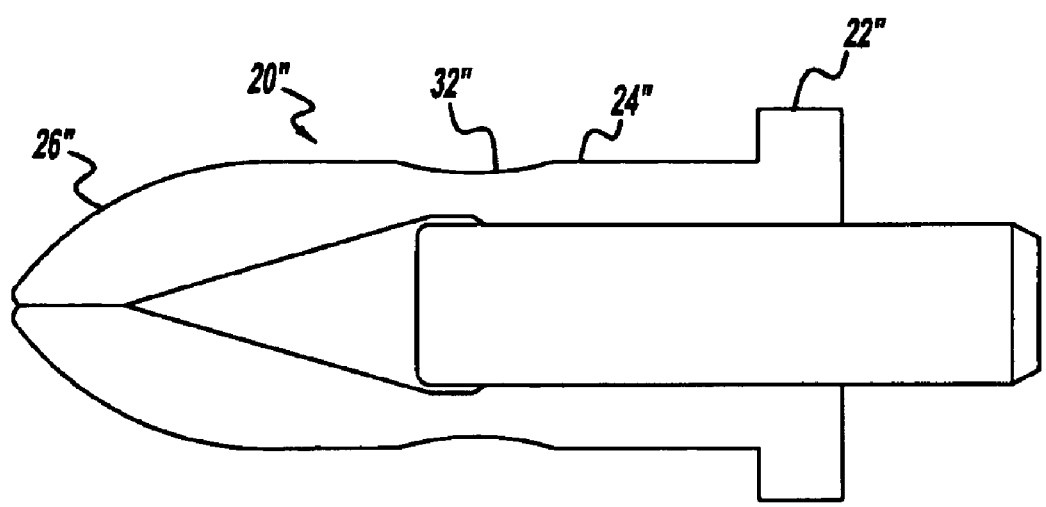
FIG. 10 is a side view of a third preferred embodiment of an outwardly expanding fastener in accordance with the present invention.
Figure 11:
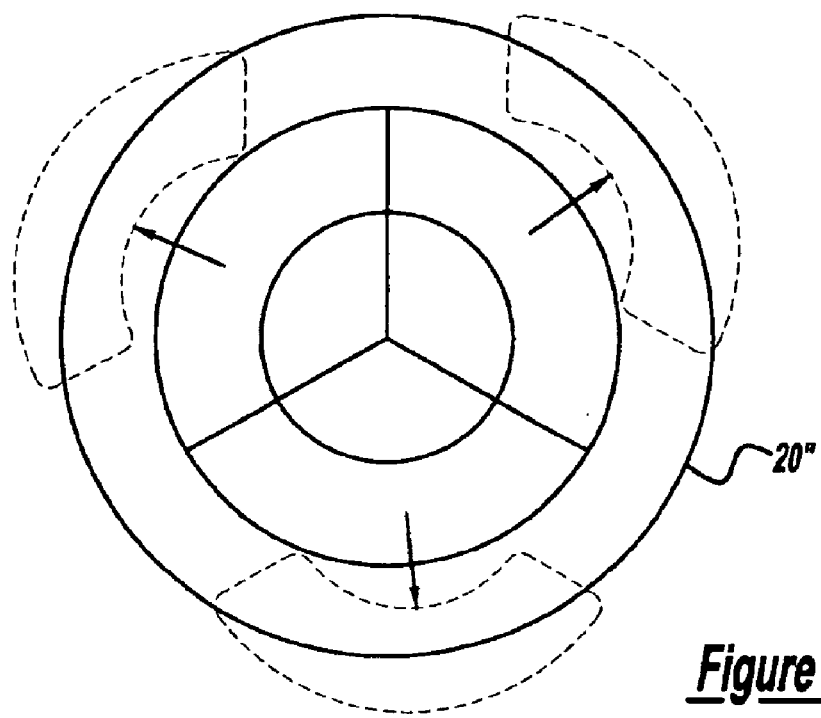
FIG. 11 is a bottom view of the third preferred embodiment of the outwardly expanding fastener in accordance with the present invention.

A third exemplary embodiment of the expanding fastener 20" is depicted in FIG. 10. Likewise, the expanding fastener 20" is primarily comprised of an integrally formed member having a head section 22", a stem section 24" and a tip section 26". However, an annular groove 32" may be formed along the outer surface of the stem section 24". As further described below, the annular groove 32" of the fastener 20" is designed to curl the inner surface of the hole made in the steel members. In addition, the fastener 20" may be configured with different fracture lines as shown in FIG. 11, or alternatively, configured with two or more segmented members.

Figure 12:
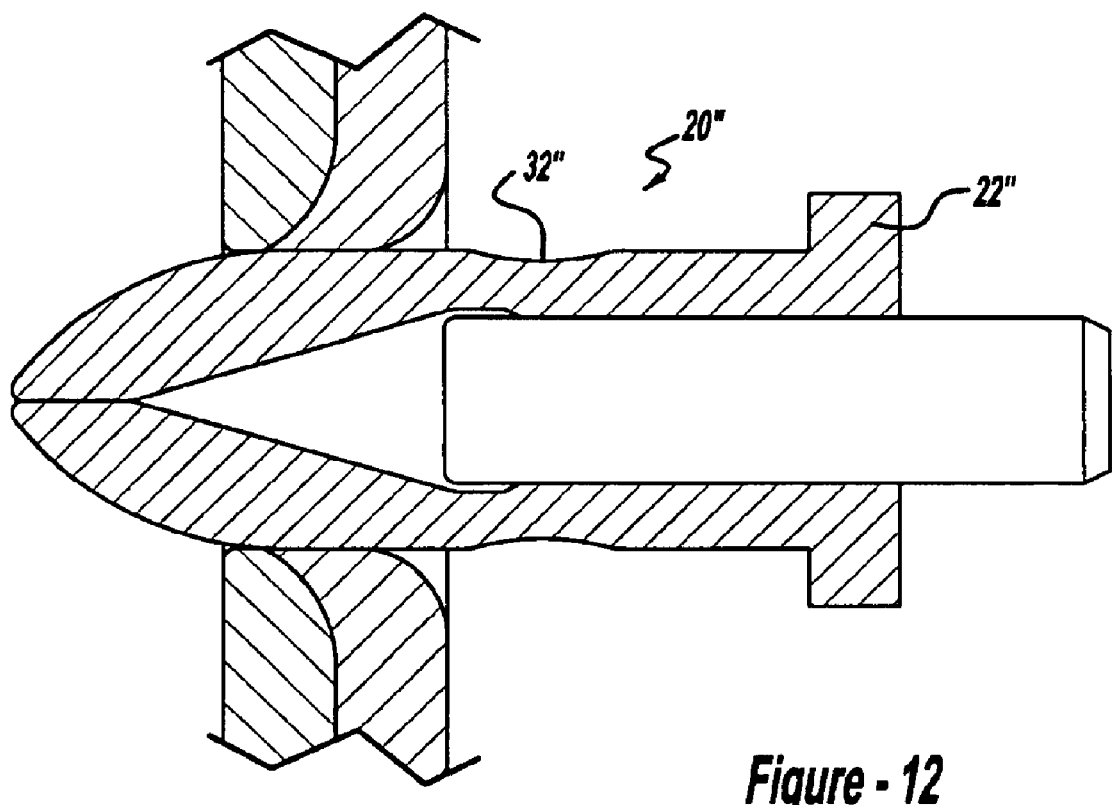
FIG. 12 is a cross-sectional view, taken along line 5—5 of FIG. 1, illustrating the third preferred embodiment of an outwardly expanding fastener penetrating partially through the steel members in accordance with the present invention.
Figure 13:
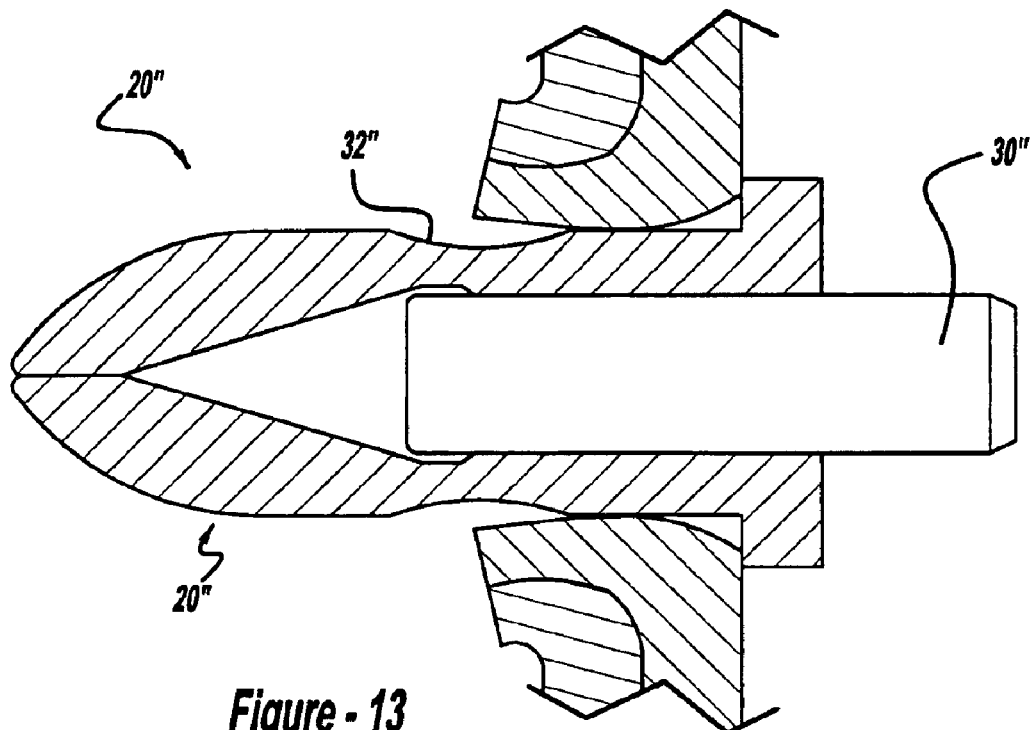
FIG. 13 is a cross-sectional view, taken along line 5—5 of FIG. 1, illustrating the third preferred embodiment of an outwardly expanding fastener being driven against the outer surface of the steel members in accordance with the present invention.
Figure 14:
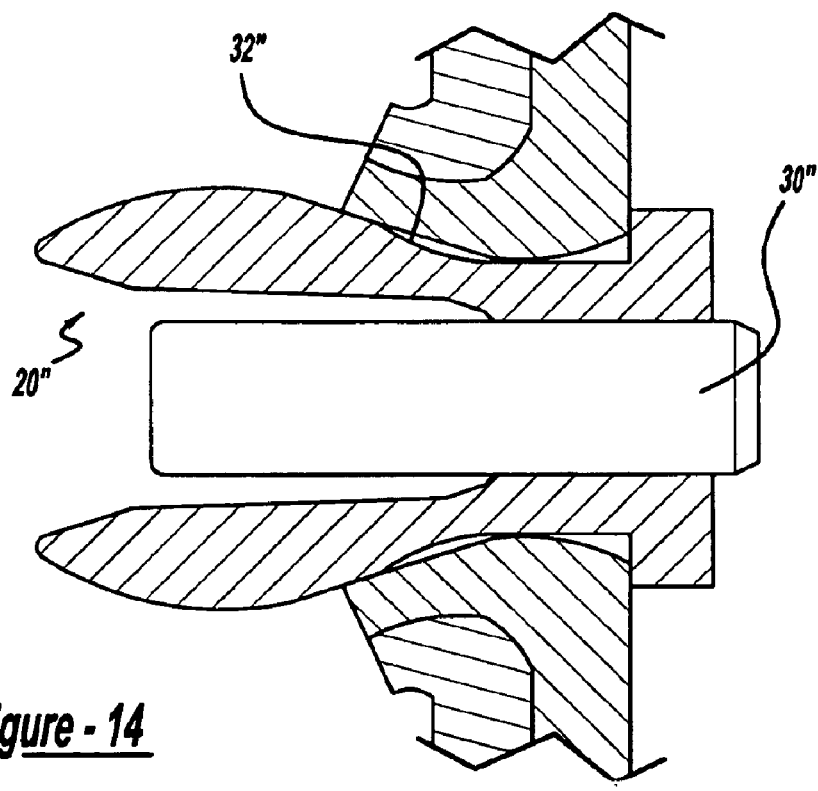
FIG. 14 is a cross-sectional view, taken along line 5—5 of FIG. 1, illustrating the radially outwardly flaring of the tip section of the third preferred embodiment of an outwardly expanding fastener in accordance with the present invention.

Referring to FIGS. 12–14, the fastener 20" is again driven into the steel members until the head section 22" of the fastener seats against the outer surface of the steel members as shown in FIG. 13. As the fastener passes through the steel members, the annular groove 32" crimps together the portion of the steel members extending below the underside of the steel members, thereby preventing separation of the two steel members. Once the fastener 20" has been driven into place, a pin 30" is then driven into the bore 28" of the fastener, thereby radially expanding the tip section 26" of the fastener as described above.

Figure 15:
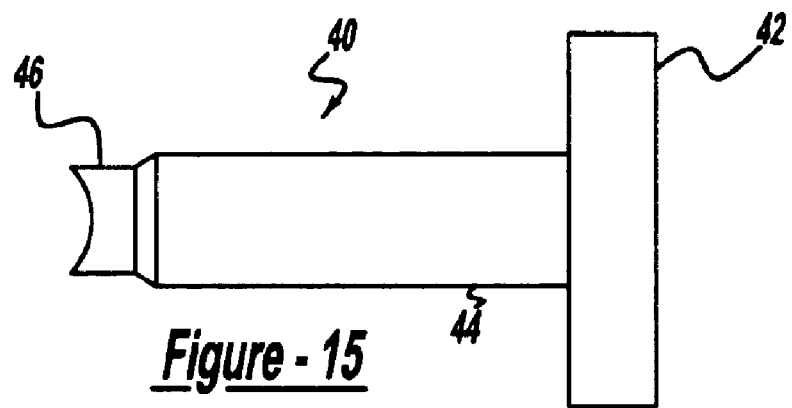
FIG. 15 is a side view of an exemplary steel tip fastener in accordance with another aspect of the present invention.

In another aspect of the present invention, one or more steel tip fasteners 40 may be used to join the steel members. An exemplary steel tip fastener 40 is shown in FIG. 15. The steel tip fastener 40 is primarily comprised of an integrally formed member having a head section 42 and a stem section 44. The member is preferably formed of a plastic material. In addition, the fastener 40 further includes a piercing nose 46 formed at the tip of the fastener, such that the steel nose 42 has a radial dimension slightly less than the radial dimension of the stem section 44 of the fastener 40. The piercing nose 46 is preferably formed of steel or other materials having similar attributes to those of steel.

Figure 16:
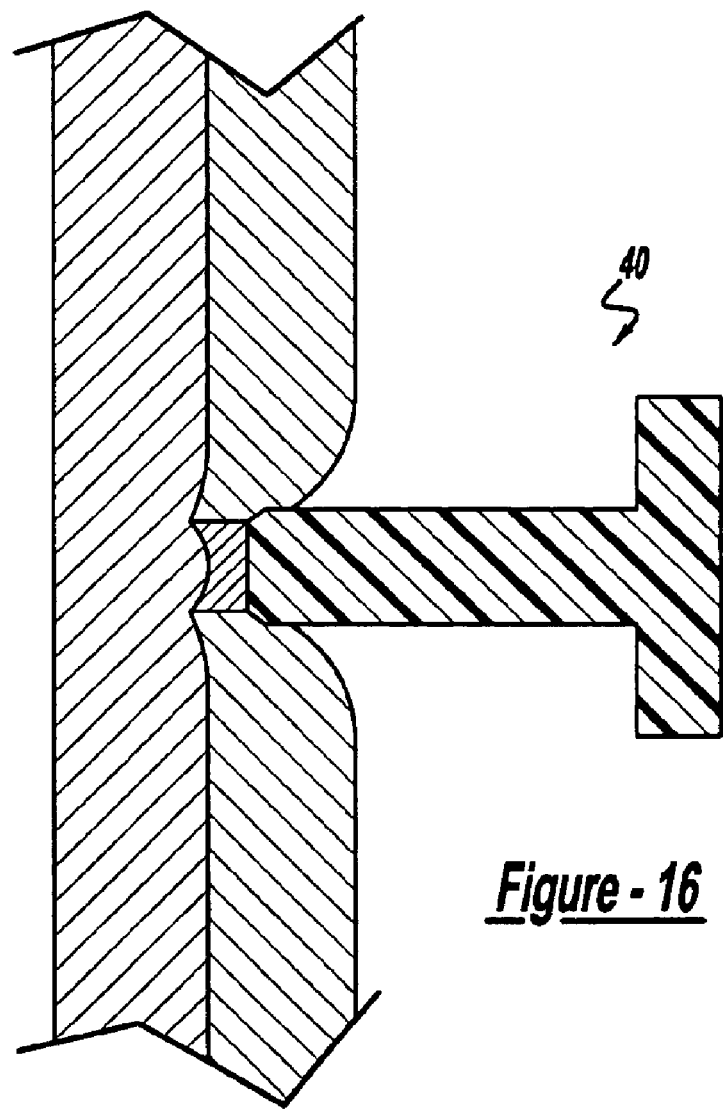
FIGS. 16 and 17 are cross-sectional views, taken along line 5—5 of FIG. 15, illustrating the steel tip fastener partially penetrating through the steel members in accordance with the present invention.
Figure 17:
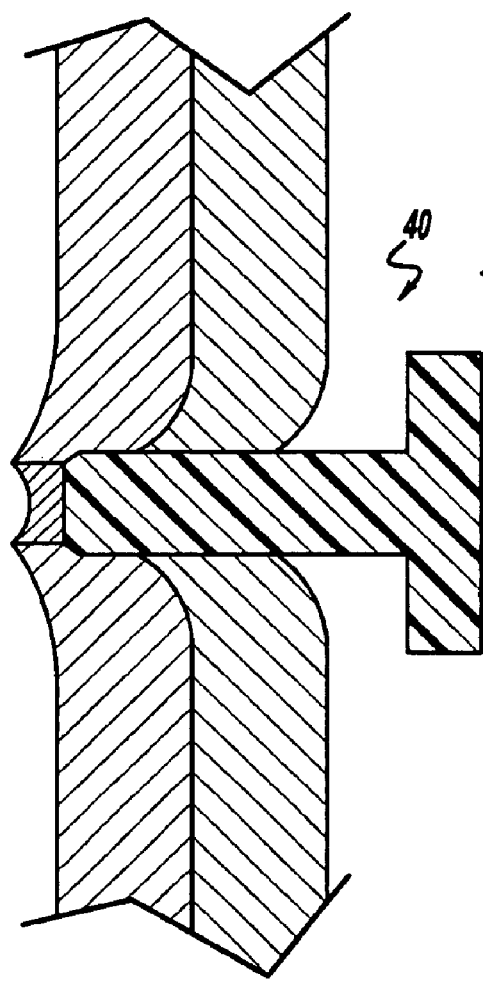
Figure 18:
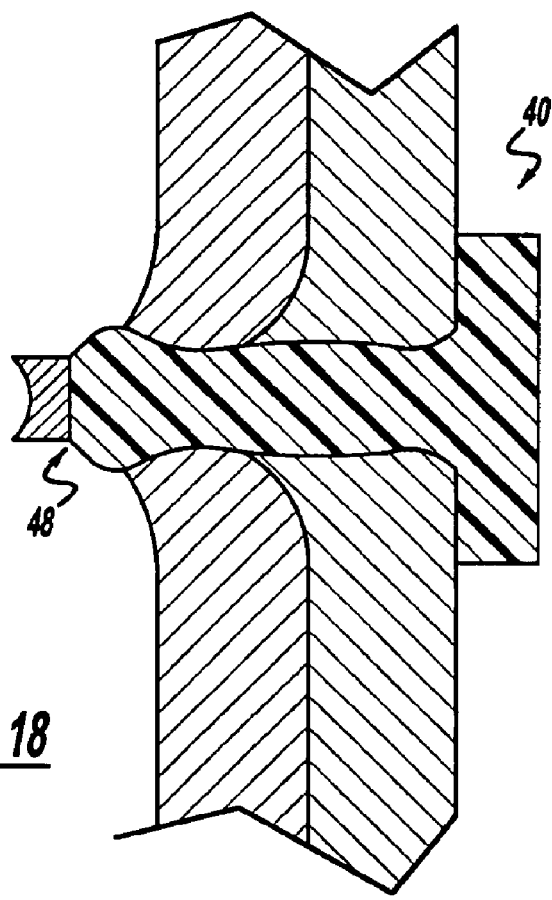
FIG. 18 is a cross-sectional view, taken along line 5—5 of FIG. 15, illustrating an enlarged stem portion of the steel tip fastener engaging the underside of the steel member in accordance with the present invention.

When the steel tip fastener 40 is driven into the steel members, the piercing nose 46 punches a hole clean through the steel members as shown in FIGS. 16 and 17. The plastic stem portion of the fastener then press fits into the hole as shown in FIG. 18. Once the fastener has been driven into place, a portion of the plastic stem will extend past the underside of the steel members. It is envisioned that the friction of the plastic being forced though the hole at a high velocity will cause the portion of the stem extending past the underside of the steel members to expand as shown at 48 of FIG. 18. In this way, the expanded plastic portion will prevent removal of the fastener from the steel members.

Figure 19:
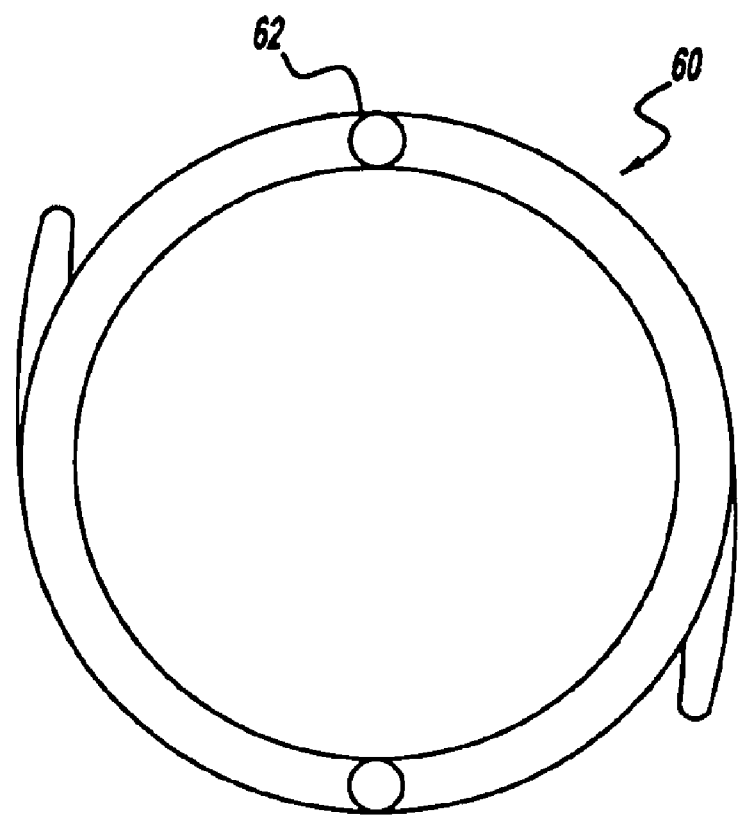
FIG. 19 is a top view of an exemplary twisted spring fastener in accordance with another aspect of the present invention.
Figure 20:
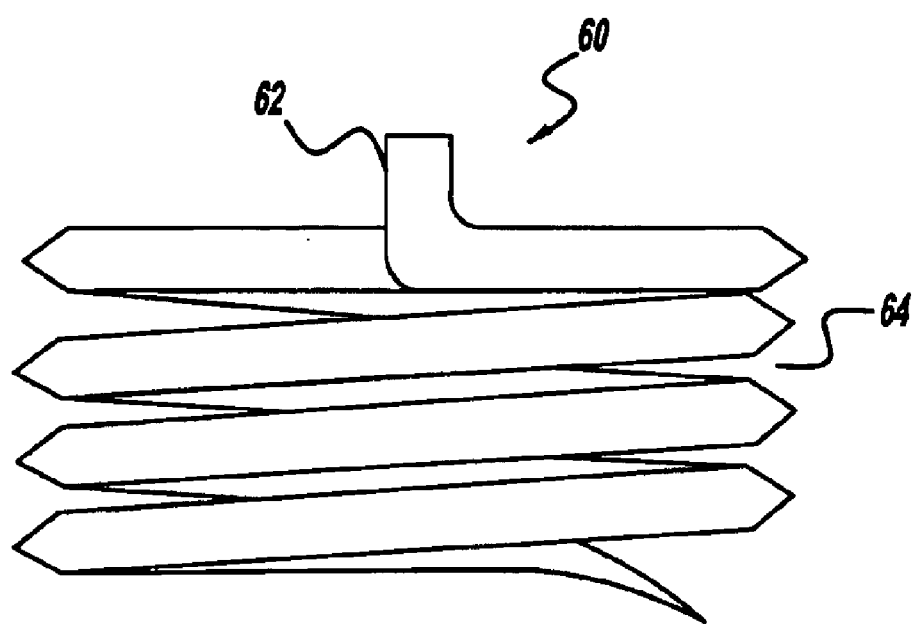
FIG. 20 is a side view of the twisted spring fastener in accordance with the present invention.

In another aspect of the present invention, one or more twisted spring fasteners 60 may be used to join the steel members. An exemplary spring fastener 60 is depicted in FIGS. 19 and 20. The spring fastener 60 is comprised of an integrally formed member having a head section 62 and a coil section 64. The fastener is preferably comprised of a steel material, but may be comprised of other materials having an elastic characteristic, such as some plastic materials reinforced with glass, kevlar or graphite fibers.

Figure 21:
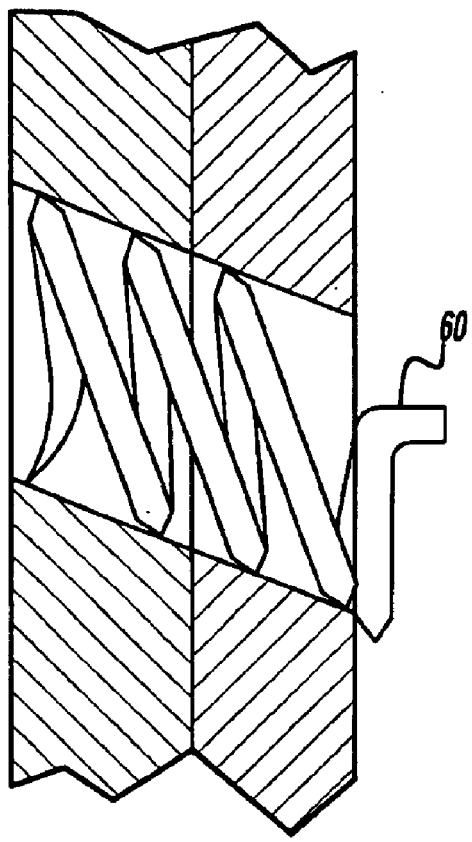
FIGS. 21 and 22 are cross-sectional views, taken along line 5—5 of FIG. 1, illustrating the twisted spring fastener being screwed through two steel members in accordance with the present invention.
Figure 22:
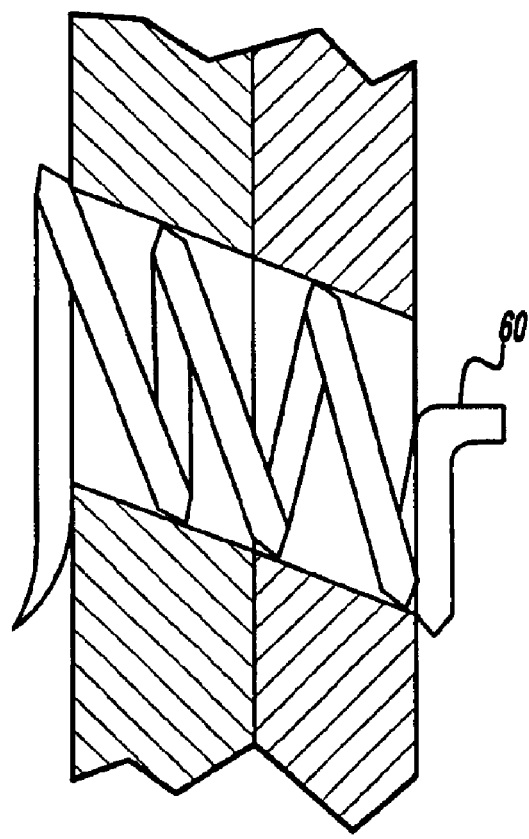

A two-step process may be used to set the fastener 60. First, a pilot hole is drilled or punched into the steel members. Second, the spring fastener 60 is screwed into the pre-drilled hole until the steel members are secured together as shown in FIGS. 21 and 22. It is envisioned that the head section 62 of the spring fastener 60 is adapted to receive one or more types of torque transmitting devices. One skilled in the art will readily recognize that various well known torque transmitting devices (such as a drill) may be used to apply the appropriate rotational torque and downward force to drive the fastener 60 into the steel members.

Figure 23:
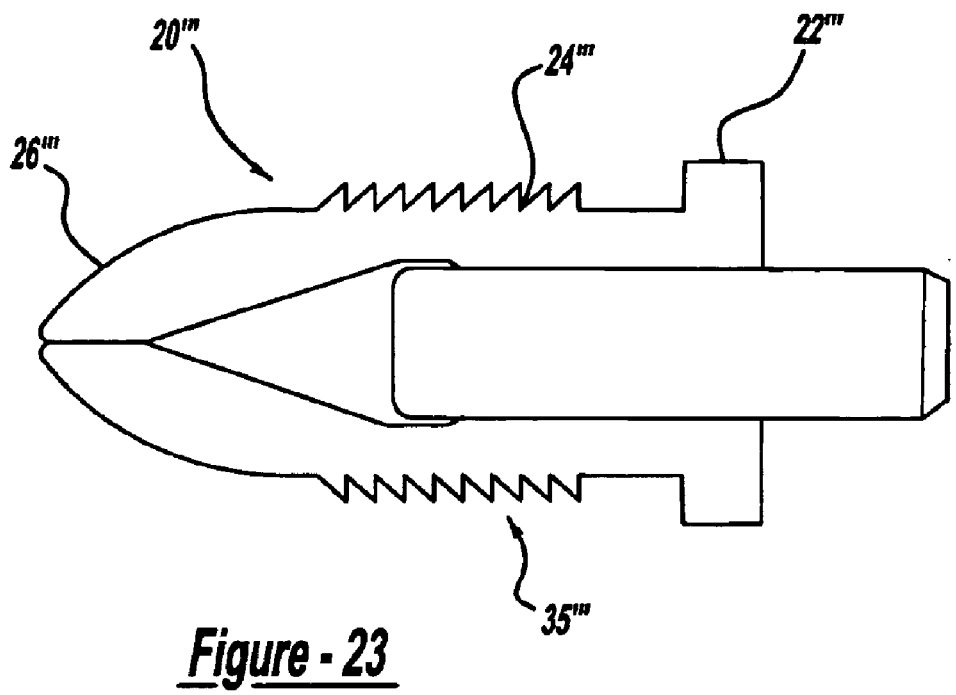
FIG. 23 is a side view of a fourth preferred embodiment of an outwardly expanding fastener in accordance with the present invention.

A fourth exemplary embodiment of the expanding fastener 20''' is depicted in FIG. 23. Likewise, the expanding fastener 20''' is primarily comprised of an integrally formed member having a head section 22''', a stem section 24''' and a tip section 26'''. However, teeth 35''' may extend along the outer surface of the stem section 24'''. As further described below, the teeth 35''' of the fastener 20''' are designed to engage with an outer surface of the steel members to further inhibit removal of expanding fastener 20'''. In addition, the fastener 20''' may be configured with different fracture lines or alternatively, configured with two or more segmented members.

Figure 24:
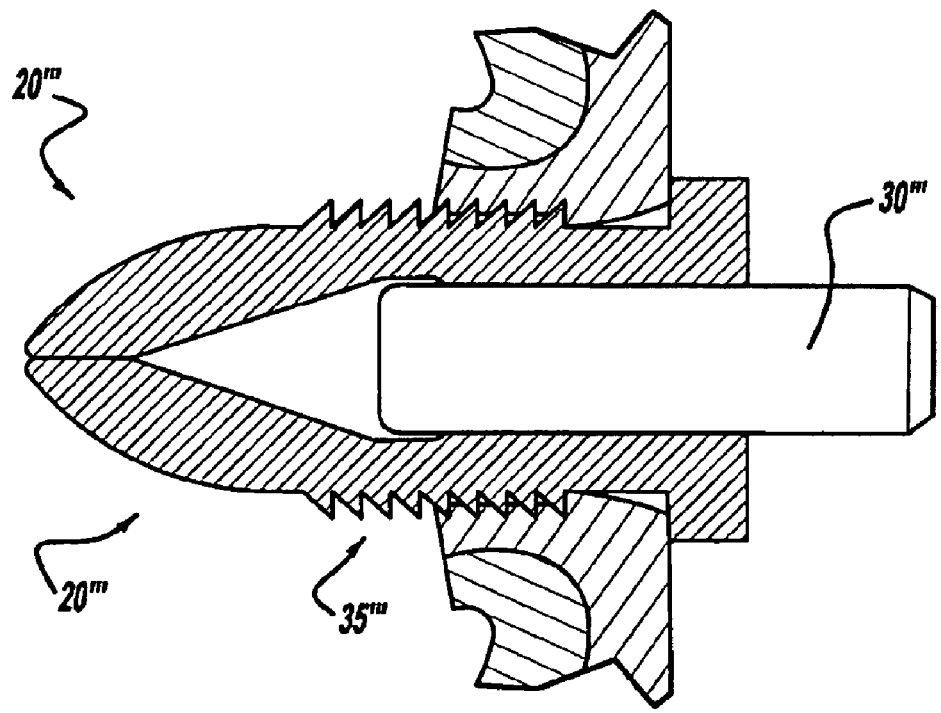
FIG. 24 is a cross-sectional view, taken along line 5—5 of FIG. 1, illustrating the fourth preferred embodiment of an outwardly expanding fastener being driven against the outer surface of the steel members in accordance with the present invention.
Figure 25:
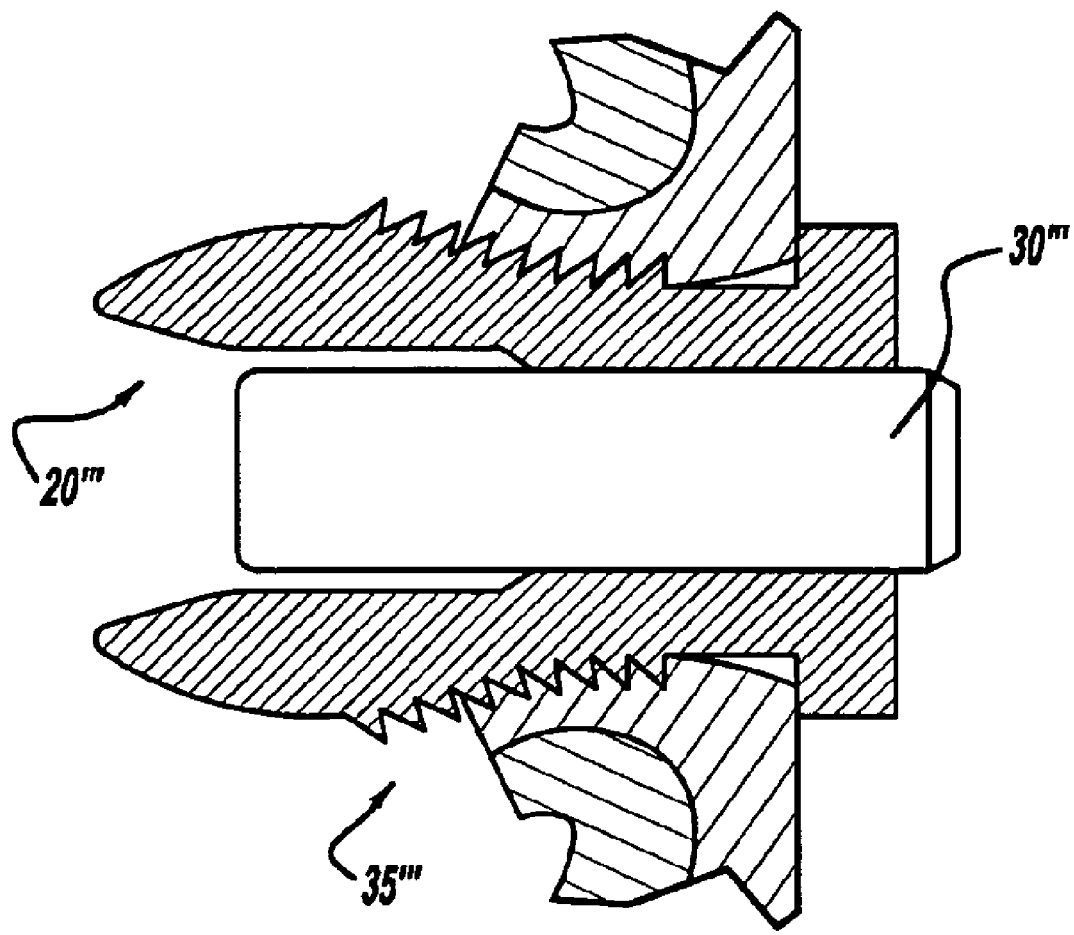
FIG. 25 is a cross-sectional view, taken along line 5—5 of FIG. 1, illustrating the radially outwardly flaring of the tip section of the fourth preferred embodiment of an outwardly expanding fastener in accordance with the present invention.

Referring to FIGS. 23–24, the fastener 20''' is again driven into the steel members until the head section 22''' of the fastener seats against the outer surface of the steel members as shown in FIG. 24. Once the fastener 20''' has been driven into place, a pin 30''' is then driven into the bore 28''' of the fastener, thereby radially expanding the tip section 26''' of the fastener as described above. The teeth 35''' engage with the outer surface of the framing members, thereby further inhibiting removal of the fastener 20'''.

While the invention has been described in its presently preferred form, it will be understood that the invention is capable of modification without departing from the spirit of the invention as set forth herein.

What is claimed is:

1. A method of fastening two of more steel framing members together with an outwardly expanding fastener, comprising:

(a) providing an integrally formed fastener having a head section, a stem section, and a tip section, wherein the fastener further includes a bore formed into the head section and extending downwardly though the stem section into the tip section;

(b) positioning the tip section of the fastener adjacent two or more adjacent steel framing members;

(c) applying an axial force to the head section of the fastener, thereby forming an opening in such framing member with the tip section and driving the fastener through said framing members until the head section of the fastener is in contact with an outer surface of one of said framing members; and (d) driving a pin through the bore and into contact with an inner surface of the tip section of the fastener, thereby causing outward flaring of a portion of the tip section that extends beyond an underside surface of said framing members such that the outwardly flared portion of the tip section inhibits removal of the fastener from the framing members.

2. The method of claim 1 wherein (a) further comprises placing one or more fracture points in the tip section of the fastener, thereby facilitating outward flaring of the tip section.

3. The method of claim 1 wherein (a) further comprises forming an external annular groove in the stem section of the fastener.

4. The method of claim 1 wherein (a) further comprises providing a tip section having at least two segmented members.

5. The method of claim 1 wherein (a) further comprises providing a fastener with a plurality of teeth spaced axially along a portion of a periphery of said fastener.

6. A method of fastening two of more steel framing members together with a steel tip fastener, comprising:

(a) providing a fastener having a head section, a stem section and a piercing nose, where the head section and stem section are integrally formed of a plastic material and the piercing nose is coupled to the stem section at an end opposite the head section;

(b) positioning the piercing nose of the fastener adjacent two or more adjacent steel framing members;

(c) applying an axially force to the head section of the fastener, such that the fastener forms an opening in such framing member, the fastener is driven through said framing members until the head section of the fastener is in contact with an outer surface of one of said framing members and a portion of the stem section extends beyond an underside surface of said framing members; and (d) expanding the portion the stem section that extends beyond the underside surface of said framing members, thereby inhibiting removal of the fastener from the framing members.

7. The method of claim 6 wherein (a) further comprises the piercing nose formed of a steel material.

8. The method of claim 6 wherein (a) further comprises the piercing nose having a maximum radial dimension less than a maximum radial dimension of the stem section of the fastener.

* * * * *

UNITED STATES PATENT AND TRADEMARK OFFICE
CERTIFICATE OF CORRECTION

PATENT NO. : 6,862,864 B2  Page 1 of 1
APPLICATION NO. : 10/176838
DATED : March 8, 2005
INVENTOR(S) : Michael L. O'Banion et al.

It is certified that error appears in the above-identified patent and that said Letters Patent is hereby corrected as shown below:

Title Page,
Item [75], Inventors, line 5, delete "Daniel Puzio, Baltimore, MD (US)".
Item [57], ABSTRACT,
Line 1, "of" should be -- or --.
Line 5, after "members" insert -- . --.

Column 5,
Line 63, "of" should be -- or --.

Column 6,
Line 5, "though" should be -- through --.
Line 10, "such" should be -- said --.
Line 11, "member" should be -- members --.
Line 36, "of" should be -- or --.
Line 46, "axially" should be -- axial --.
Line 47, "such" should be -- said --.
Line 48, "member," should be -- members, --.
Line 54, after "portion" insert -- of --.

Signed and Sealed this

Fifteenth Day of August, 2006

JON W. DUDAS
*Director of the United States Patent and Trademark Office*